United States Patent Office 3,264,257
Patented August 2, 1966

3,264,257
POLY-α-OLEFIN COMPOSITIONS CONTAINING ORGANOPHOSPHORUS COMPOUNDS AS STABILIZERS
Silvio L. Giolito, Whitestone, and Sheldon Herbstman, Bronx, N.Y., and Adam F. Kopacki, Westwood, N.J., assignors to Stauffer Chemical Company, New York, N.Y., a corporation of Delaware
No Drawing. Filed July 10, 1963, Ser. No. 294,159
7 Claims. (Cl. 260—45.95)

This invention relates to poly-α-olefin compositions. In a more particular sense, the invention is concerned with the stabilization of poly-α-olefin compositions against deterioration resulting from exposure to actinic radiation by means of certain organic thiophosphorus compounds.

It is known in the art that poly-α-olefins such as polyethylene, polypropylene and the like are subject to deterioration when exposed to actinic radiation of the type exemplified by sunlight and ultra-violet light. The effect of the exposure is to reduce the tensile strength of the polymer to the point of mechanical failure. In fact, prolonged exposure reduces the polymer to a powdery mass. It is generally conceded that the breakdown is a photo-oxidation phenomenon, a conclusion which is substantiated by the detection of carbonyl functions in the polymer molecule during the early stages of the degradation.

Since many polymers have little or no innate resistance to photo-oxidation, at least for prolonged periods of exposure, the commercialization of a plastic often depends on development of a suitable stabilizer. Moreover, the efficiency of U.V. stabilizers varies considerably in different polymeric systems. For instance, a particular stabilizer capable of giving excellent results when used in conjunction with halogen-containing polymers such as polyvinyl cloride or polyvinylidine cloride may be unsatisfactory for protecting poly-α-olefin resins. One reason for such varying behavior can probably be attributed to the fact that stabilizers in halogen-containing polymers function essentially as hydrogen halide scavengers while stabilizers in halogen-free poly-α-olefins operate through different mechanisms. Nor are ultraviolet stabilizers which are adapted for cellulosic esters such as cellulose triacetate, cellulose acetate butyrate, etc. necessarily effective in a poly-α-olefin system.

Although certain broad generalizations can be inferred, the stabilizer art as presently practiced is essentially an empirical technique and as a consequence, the development of an ultra-violet inhibitor for a particular polymer may involve a considerable amount of trial and error experimentation.

With the realization that the poly-α-olefins constitute a class of plastic materials having a wide range of useful properties, much work and effort has been channelled into the development of suitable stabilizers with a view to extending and improving the usefulness of this polymeric system.

The first of the poly-α-olefins to be achieved commercially was polyethylene, a polymer which is currently being manufactured in enormous quantities and finds use in numerous applications. Another poly-α-olefin to come into prominence recently is polypropylene and in many areas of utility it has been found superior to the more common polyethylene. As new uses and applications have opened up for polypropylene, there exists a concurrent need to develop suitable U.V. stabilizers for the polymer in order that it may withstand prolonged exposure to sunlight and weathering and other severe environmental conditions.

It has been discovered that the use of certain organic thiophosphorus compounds are unusually effective in stabilizing poly-α-olefins against deterioration caused by exposure to actinic radiation and the provision of poly-α-olefin compositions stabilized in the aforedescribed manner constitutes a primary object and purpose of this invention. Other objects and purposes will become apparent as the description proceeds.

In accordance with the present invention, we have succeeded in producing poly-α-olefin compositions exhibiting unusually high resistance against photo-oxidation by incorporating in the said poly-α-olefin composition as a U.V. absorber or stabilizer a thiophosphorus compound of the following formula:

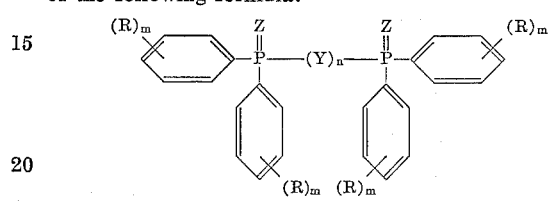

wherein R represents hydrogen, hydroxy, chlorine, lower alkyl, e.g. methyl, ethyl, n-propyl, n-butyl, sec.-butyl, tert-.butyl, etc., lower alkoxyl, e.g. methoxy, ethoxy, n-propoxy, n-butoxy, iso-butoxy, etc. Z and Y are chalcogens as represented by oxygen and sulfur, and $n$ is an integer of from 1 to 5 when Y is sulfur and $n$ is unity when Y is oxygen, and $m$ is an integer of from 1 to 5. Exemplary structures falling within the ambit of the aforedescribed general formula include the following:

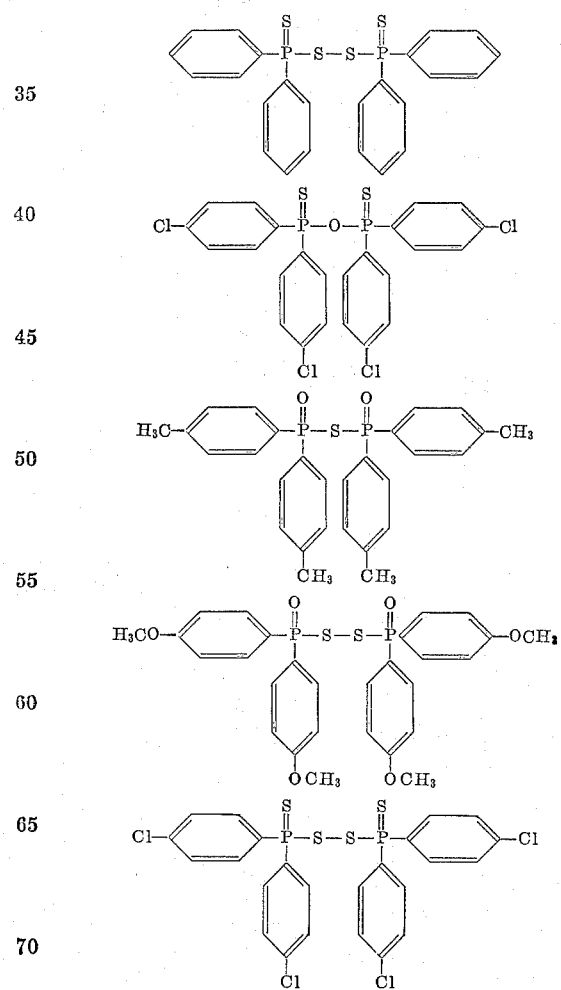

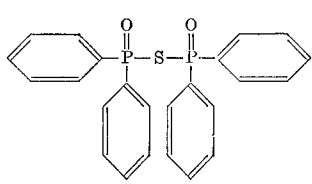

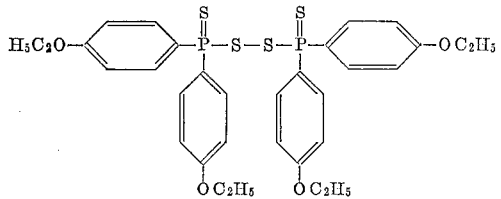

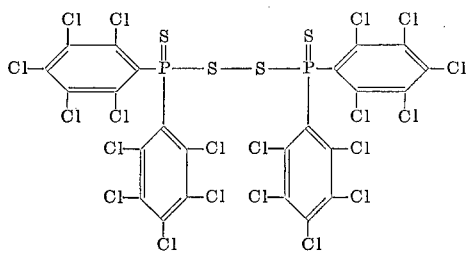

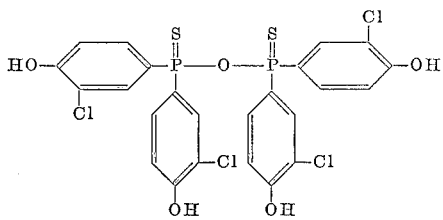

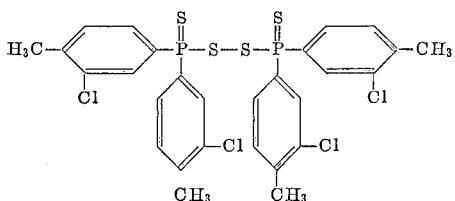

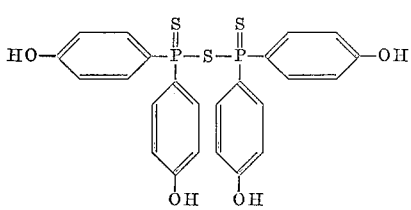

The thiophosphorus compounds which are contemplated herein as U.V. stabilizers for poly-α-olefins are in many instances known chemical entities, the description and preparation of which can be found in the technical literature. In general, the diphenylphosphinyl and diphenylphosphinothioyl sulfides are prepared by heating the corresponding diphenylphosphinothioic and diphenylphosphinodithioic acids in accordance with the method disclosed in U.S. Patent 2,727,067. The reaction is preferably carried out at temperatures above 100° C. but below the melting point of the diphenylphosphinic acid starting materials. The diphenylphosphinic disulfides are likewise known materials and can readily be obtained by oxidation of diphenylphosphinothioic and diphenylphosphinodithioic acids, and in this connection, elementary iodine serves as an excellent oxidizing agent. The diphenylphosphinothioyl and diphenylphosphinyl oxides are realized by the oxidation of the corresponding sulfide by means of nitric acid as described in JACS 78, 4449 (1956). In the case of the polysulfides, these are formed by reacting the S-alkali salt of the requisite diphenyl-thiophosphinic acid with a sulfur chloride, e.g. $SCl_2$, $S_2Cl_2$, etc.

It will be observed that the aforedescribed syntheses are designed to give symmetrical structures as a result of oxidative coupling of the reactants. However, unsymmetrical derivatives can also be realized by first forming the diphenylphosphinic oxide or sulfide followed by the introduction of various substituents on the phenyl ring by means of reactions commonly used to effect aromatic substitutions.

The U.V. stabilizers contemplated by the invention can be blended or incorporated into the poly-α-olefin compositions by any of the conventional methods commonly used for mixing such materials with resins and plastics. A typical procedure comprises milling on heated rolls, although deposition from solvents and dry blending are other well known techniques.

The poly-α-olefin compositions stabilized in accordance with the invention exhibit an extended life expectancy and are much more useful and practical than unstabilized poly-α-olefins and moreover possess a wide diversity of uses including out-of-door installations under prolonged exposure to sunlight and the elements. The poly-α-olefins stabilized as contemplated herein can be cast, extruded, rolled or molded into sheets, rods, tubes, piping, filaments and other shaped articles, including sheets or films ranging from 0.5 to 100 mils in thickness. The polymer compositions of our invention can be applied as coatings to paper, cloth, wire, metal foil and are suitable for the manufacture of synthetic fibers and fabrics. Although the quantity of stabilizer is not particularly critical, it is recommended that the concentration based on the weight of the polymer be maintained in the range of 0.01 to about 5.0%.

The organic thiophosphorus compounds as described herein are suitable for stabilizing a wide variety of solid poly-α-olefin compositions against deterioration resulting from exposure to actinic radiation. In this connection, mention is made of any of the normally solid polymers derived from the polymerization of α-mono-olefinic aliphatic hydrocarbons containing from two to ten carbon atoms. Typical poly-α-olefins include polyethylene, polypropylene, poly(3-methylbutene-1), poly(4-methylpentene-1), poly(pentene-1), poly(3,3-dimethylbutene-1), poly(4,4-dimethylbutene-1), poly(octene-1), poly(decene-1), and the like. We have ascertained that the organic thiophosphorus stabilizers of the invention are particularly useful for preventing photo-degradation by ultraviolet light or sunlight of the highly crystalline polyolefins such as isotactic polypropylene. Isotactic polypropylene is a stereo-regular polymer wherein the monomeric units are linked predominantly end-to-end rather than the more common arrangement consisting of a distribution of linear and cross-linked units. Moreover, the substituents attached to the chain are systematically disposed in a configuration which tends to promote an orderly and close alignment of the molecules. Such stereo-regular polymers exhibit a high degree of crystallinity and are much superior in physical properties to amorphous polymers having a random distribution of monomeric units. For a fuller description of crystalline polymers, reference is made to the Scientific American, 197, No. 3, pages 98–104 (1957); 205, No. 2, pages 33–41 (1961).

Although the molecular weight of poly-α-olefins varies over wide limits, the U.V. stabilizer compounds of the invention are not restricted to any particular molecular weight range and in fact it has been our finding that excellent protection can be achieved with poly-α-olefins ranging in molecular weight from about 15,000 to about 20,000. Moreover, the so-called poly-α-olefin waxes are likewise susceptible to U.V. stabilization by means of the compounds of the invention.

The folowing example illustrates the procedure for preparing stabilized poly-α-olefin compositions of the invention although the inclusion of such example is not to be taken as limiting or otherwise imposing any restriction on the invention, and it is to be understood that variations in practicing the same without departing from the scope or spirit thereof will be apparent to those skilled in the art to which the said invention pertains.

EXAMPLE

A dry blend consisting of 0.5% of the U.V. stabilizer of the invention and 50 g. of isotactic polypropylene was subjected to extrusion-compounding in the usual manner at a temperature of 400° F. for six minutes at 2000 p.s.i. The blended polymer was extruded into a 25 ml. sheet and thereafter cut into square samples measuring 2 inches. A like sample containing no stabilizer was also prepared and tested. The samples were then exposed in a Xenon Arc Weatherometer operating at 6000 watts. The water cycle was adjusted whereby each sample was subjected to 18 minutes of water spray for each two hours of dry exposure. Exposure damage to the samples of polypropylene was assessed with respect to change of structural strength. The results of the test are summarized by the data set forth in the table below.

Table

| Compound | Exposure in Hours to Embrittlement |
|---|---|
| (structure 1) | 2,114 |
| (structure 2) | 1,739 |
| (structure 3) | 898 |
| (structure 4) | 1,462 |
| (structure 5) | 1,443 |

The exposure is reported as the number of hours in the Weatherometer which produces structural failure of the sample which for the purposes of these tests refers to the degree of brittleness which causes the samples to break when flexed through 180°.

The Weatherometer as used in compiling the data and tests described herein is identified as a 6000 watt Xenon Arc Weatherometer Model 60W.

The polypropylene resin was an unstabilized general purpose, high molecular weight polypropylene of the isotactic or crystalline type. Typically, it has a melt index of 4 at 230° and a specific gravity of 0.905. The resin can be purchased from any number of chemical supply houses or manufacturers. The results obtained in using the various grades and types of polypropylene were in general agreement with the test data recorded in the table.

We claim:

1. A stabilized poly-α-olefin composition comprising a solid poly-α-olefin formed from an α-monoolefinic aliphatic hydrocarbon having from 2 to 10 carbon atoms and as a stabilizer therefor a stabilizing quantity of an organic phosphorus compound of the formula:

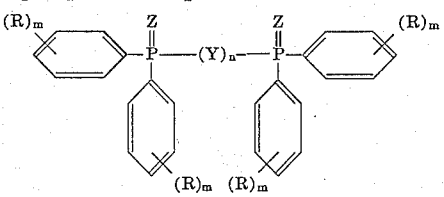

wherein R is selected from the class consisting of hydrogen, hydroxyl, chlorine, lower alkyl and lower alkoxyl, Z and Y are chalcogens selected from the class consisting of oxygen and sulfur, and $n$ is unity when Y is oxygen and $n$ is an integer of from 1 to 5 when Y is sulfur, and $m$ is an integer of from 1 to 5.

2. A stabilized poly-α-olefin composition comprising solid polypropylene and as a stabilizer therefor 0.01% to 5% by weight based on the polypropylene of an organic phosphorus compound of the formula:

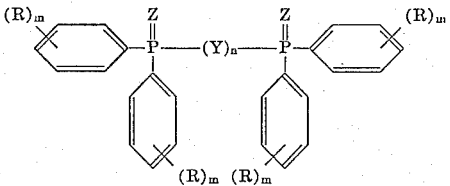

wherein R is selected from the class consisting of hydrogen, hydroxyl, chlorine, lower alkyl and lower alkoxyl, Z and Y are chalcogens selected from the class consisting of oxygen and sulfur, and $n$ is unity when Y is oxygen and $n$ is an integer of from 1 to 5 when Y is sulfur, and $m$ is an integer of from 1 to 5.

3. A stabilized poly-α-olefin composition comprising solid polypropylene and as a stabilizer therefor 0.01% to 5% by weight based on the polypropylene of an organic phosphorus compound of the formula:

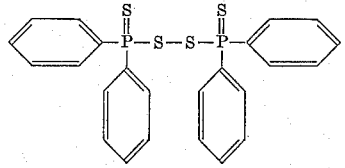

4. A stabilized poly-α-olefin composition comprising solid polypropylene and as a stabilizer therefor 0.01% to 5% by weight based on the polypropylene of an organic phosphorus compound of the formula:

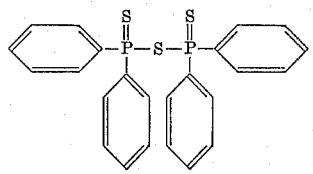

5. A stabilized poly-α-olefin composition comprising solid polypropylene and as a stabilizer therefor 0.01% to 5% by weight based on the polypropylene of an organic phosphorus compound of the formula:

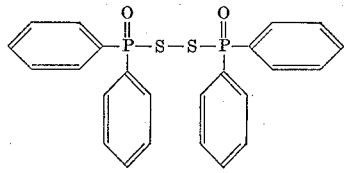

6. A stabilized poly-α-olefin composition comprising solid polypropylene and as a stabilizer therefor 0.01% to 5% by weight based on the polypropylene of an organic phosphorus compound of the formula:

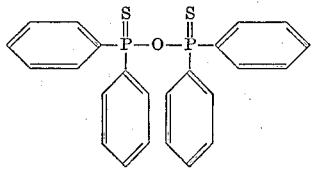

7. A stabilized poly-α-olefin composition comprising solid polypropylene and as a stabilizer therefor 0.01% to 5% by weight based on the polypropylene of an organic phosphorus compound of the formula:

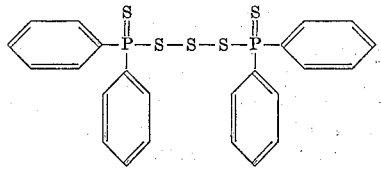

No references cited.

LEON J. BERCOVITZ, *Primary Examiner.*

M. J. WELSH, *Assistant Examiner.*